(12) United States Patent
Tomomatsu

(10) Patent No.: US 11,897,291 B2
(45) Date of Patent: *Feb. 13, 2024

(54) PNEUMATIC TIRE

(71) Applicant: The Yokohama Rubber Co., LTD., Kanagawa (JP)

(72) Inventor: Ryouichi Tomomatsu, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/855,076

(22) Filed: Jun. 30, 2022

(65) Prior Publication Data

US 2022/0324265 A1    Oct. 13, 2022

Related U.S. Application Data

(62) Division of application No. 16/644,489, filed as application No. PCT/JP2018/032092 on Aug. 30, 2018, now Pat. No. 11,407,257.

(30) Foreign Application Priority Data

Sep. 6, 2017 (JP) ................................ 2017-170858

(51) Int. Cl.
*B60C 11/13* (2006.01)
*B60C 11/03* (2006.01)

(52) U.S. Cl.
CPC ...... *B60C 11/1307* (2013.01); *B60C 11/0302* (2013.01); *B60C 11/0304* (2013.01);
(Continued)

(58) Field of Classification Search
None
See application file for complete search history.

(56) References Cited

U.S. PATENT DOCUMENTS

| 9,770,951 B2 * | 9/2017 | Takahashi ........... B60C 11/0302 |
| 2017/0106703 A1 | 4/2017 | Kubo |

(Continued)

FOREIGN PATENT DOCUMENTS

| JP | H03-132403 | 6/1991 |
| JP | H11-078433 | 3/1999 |

(Continued)

OTHER PUBLICATIONS

International Search Report for International Application No. PCT/JP2018/032092 dated Nov. 27, 2018, 4 pages, Japan.

*Primary Examiner* — Yung-Sheng M Tsui
(74) *Attorney, Agent, or Firm* — Thorpe North & Western

(57) ABSTRACT

A tread pattern of a pneumatic tire includes one center continuous land portion and two intermediate continuous land portions that are divided by four circumferential main grooves and that are not provided with lug grooves. Edges on both sides of one center main groove include groove chamfered portions having a chamfered width changing in the circumferential direction in a zigzag shape. In the regions of the intermediate continuous land portions, first sipes extending inward in the lateral direction from shoulder main grooves of the main grooves, which are positioned on outer sides in the lateral direction, are provided. The first sipes each include a sipe main body portion having a constant distance between sipe wall surfaces on a sipe bottom side and a sipe chamfered portion inclined so that the sipe wall surfaces are open toward the tread surface.

14 Claims, 6 Drawing Sheets

(52) U.S. Cl.
CPC ............... *B60C 2011/0346* (2013.01); *B60C 2011/0348* (2013.01); *B60C 2011/0353* (2013.01)

(56) References Cited

U.S. PATENT DOCUMENTS

| | | | |
|---|---|---|---|
| 2017/0210176 A1 * | 7/2017 | Ninomiya | ............... B60C 11/04 |
| 2018/0170114 A1 | 6/2018 | Hayashi | |
| 2018/0194173 A1 | 7/2018 | Shibai | |
| 2018/0207991 A1 | 7/2018 | Shibai | |
| 2019/0023077 A1 | 1/2019 | Pirelli | |
| 2019/0030957 A1 | 1/2019 | Shibai | |

FOREIGN PATENT DOCUMENTS

| | | | |
|---|---|---|---|
| JP | 2005-132285 | | 5/2005 |
| JP | 2010-006096 | | 1/2010 |
| JP | 2015-134581 | | 7/2015 |
| JP | 2015-134581 | A | 7/2015 |
| JP | 2015134581 | A * | 7/2015 |
| JP | 2016-074256 | | 5/2016 |
| JP | 2016-074256 | A | 5/2016 |
| JP | 2016-113003 | | 6/2016 |
| JP | 2016-113003 | A | 6/2016 |
| JP | 2016113003 | A * | 6/2016 |
| JP | 2016-132358 | | 7/2016 |
| JP | 2016132358 | A * | 7/2016 |
| JP | 2017-001584 | | 1/2017 |
| JP | 2017-030556 | | 2/2017 |
| JP | 2017-030557 | A | 2/2017 |
| JP | 2017-074842 | | 4/2017 |
| JP | 2017-144760 | | 8/2017 |
| WO | WO 2016/199519 | | 12/2016 |
| WO | WO 2017/022308 | | 2/2017 |
| WO | WO 2017/115195 | A1 | 7/2017 |
| WO | WO 2017/126375 | | 7/2017 |
| WO | WO 2017/141651 | | 8/2017 |

* cited by examiner

PNEUMATIC TIRE

RELATED APPLICATIONS

This application is a divisional of U.S. patent application Ser. No. 16/644,489, filed on Mar. 4, 2020, which is the National Stage of International Patent Application No. PCT/JP2018/032092, filed on Aug. 30, 2018, which claims the benefit of priority from Japan Patent Application No. 2017-170858, filed on Sep. 6, 2017.

TECHNICAL FIELD

The present technology relates to a pneumatic tire.

BACKGROUND ART

For a pneumatic tire, on a tread portion, a tread pattern is formed in which a plurality of main grooves extending in a tire circumferential direction are provided and a plurality of rows of land portions are defined by the plurality of main grooves. In such a pneumatic tire, good drainage performance is achieved by providing a plurality of lug grooves extending in a tire lateral direction in each of the land portions of the tread portion.

However, when the number of the lug grooves in the tread portion is increased, the rigidity of the tread portion (tread rigidity) is degraded, which degrades steering stability performance on dry road surfaces. In contrast, when the number of lug grooves in the tread portion is reduced, drainage performance is degraded, which degrades steering stability on wet road surfaces. Thus, steering stability on dry road surfaces and steering stability on wet road surfaces are inconsistent with each other. Further, pattern noise is increased by providing the lug grooves.

For example, a pneumatic tire capable of achieving steering stability on dry road surfaces and steering stability on wet road surfaces in a compatible manner and further improving uneven wear resistance has been known (see Japan Unexamined Patent Publication No. 2017-30556).

The pneumatic tire includes, in a tread portion, a center main groove extending in tire circumferential direction in a zigzag shape along the tire circumferential direction and a shoulder main groove extending in the tire circumferential direction on an outer side of the center main groove. Further, the pneumatic tire includes, in land portions between the center main groove and the shoulder main groove, a plurality of lug grooves, which extend inward in the tire lateral direction from the shoulder main groove and are terminated without communicating with the center main groove. At a terminating end of each of the lug grooves, a bent portion that is bent toward one side in the tire circumferential direction is formed. In the land portions, a plurality of narrow grooves that extend intermittently along the tire circumferential direction without communicating with the bent portions are formed. The narrow grooves are disposed substantially parallel with the center groove having a zigzag shape.

The pneumatic tire described above is capable of achieving steering stability performance on dry road surfaces and steering stability performance on wet road surfaces in a compatible manner and further improving uneven wear resistance performance. However, pattern noise caused due to the lug grooves provided in the land portions is not reduced and remains loud. When the lug grooves are not provided in the land portions, steering stability performance on wet road surfaces is liable to be degraded.

SUMMARY

The present technology provides a pneumatic tire capable of improving steering stability performance on dry road surfaces and steering stability performance on wet road surfaces compared to the related art and suppressing pattern noise.

An aspect of the present technology is a pneumatic tire. The pneumatic tire, includes:

a tread portion extending in a tire circumferential direction, having an annular shape, and having a tread pattern, wherein the tread pattern including:

two inner main grooves being positioned on both sides in a tire lateral direction with respect to a tire equator line of the pneumatic tire and being formed in an entire circumference in the tire circumferential direction;

two outer main grooves being provided and sandwiching the two inner main grooves on an inner side in the tire lateral direction;

an inner continuous land portion being sandwiched between the two inner main grooves and being continuously formed in the entire circumference in the tire circumferential direction;

two intermediate continuous land portions being sandwiched between one of the two inner main grooves and one of the two outer main grooves and between the other one of the two inner main grooves and the other one of the two outer main grooves, respectively, the two intermediate continuous land portions being continuously formed in the entire circumference in the tire circumferential direction, the two intermediate continuous land portions being outward in the tire lateral direction of the inner continuous land portion; and first sipes being provided in regions of the two intermediate continuous land portions and extending inward in the tire lateral direction from the two outer main grooves.

Regions of the inner continuous land portion and the two intermediate continuous land portions being not provided with lug grooves extending from the two inner main grooves or the two outer main grooves.

Edges on both sides of one of the two inner main grooves each including a groove chamfered portion having a chamfered width changing in the tire circumferential direction and forming a zigzag shape as seen from a tread surface of the tread portion. The first sipes each including: a sipe main body portion having a constant distance between sipe wall surfaces on a sipe bottom side in a depth direction of the first sipes; and a sipe chamfered portion inclined so that the sipe wall surfaces are open to the tread surface on a side of the tread surface of the first sipes.

The first sipes are preferably provided to be inclined in the tire lateral direction from the two outer main grooves to the inner continuous land portion and to be closed in the regions of the two intermediate continuous land portions. As seen from the tread surface, a surface contour shape of each of first sipes a of the first sipes, which extends from an outer main groove A being one of the two outer main grooves, preferably has: an extending portion extending constantly in an extension direction or with smooth change from the outer main groove A; and a bent portion provided on a side of a closed end portion of each of the first sipes a, the bent portion bending each of the first sipes a from the extending portion and extending to a direction opposite a direction to which the extending portion extends in the tire circumferential direction. In the bent portion, the sipe main body portion preferably extends from the extending portion constantly in the extension direction or with smooth change without being bent and is closed, and the sipe chamfered portion preferably forms a bent shape of the bent portion.

Further, a sipe wall surface being one of two facing sipe wall surfaces of the sipe chamfered portion preferably includes a first chamfered surface and a second chamfered surface at different positions in a sipe depth direction, an inclination angle of each of the first chamfered surface and the second chamfered surface with respect to the depth direction of the first sipes being different each other, and the sipe chamfered portion preferably forms a bent shape of the bent portion.

The inclination angle of the first chamfered surface is preferably identical to that of a counter chamfered surface opposing the first chamfered surface.

Further, the inclination angle of the second chamfered surface is preferably larger than the inclination angle of the first chamfered surface. In this case, the second chamfered surface is preferably positioned on the side of the tread surface with respect to the first chamfered surface.

A chamfered width of the two facing chamfered surfaces is preferably reduced as approaching to a closed end of the sipe main body portion.

Narrow grooves each being prevented from communicating with the bent portion are preferably formed intermittently in the tire circumferential direction in a region of an intermediate continuous land portion α of the two intermediate continuous land portions in which the first sipes a are provided, and an extension direction of the narrow grooves is preferably parallel with an extension direction of an edge of the surface contour shape on a side of the two inner main grooves.

The pneumatic tire preferably has a mounting direction that is specified with respect to a vehicle, and the outer main groove A preferably is instructed, +−by the mounting direction to be positioned on an outer vehicle side with respect to an outer main groove B of the two outer main grooves, the outer main groove B being different from the outer main groove A.

Second sipes are preferably provided in a region of an intermediate continuous land portion β of the two intermediate continuous land portions, which is sandwiched between an outer main groove of the two outer main grooves different from the outer main groove A and one of the two inner main grooves, the second sipes extending from one of the two inner main grooves and being closed without communicating with the outer main groove. Third sipes are preferably provided in the region of the inner continuous land portion, the third sipes extending from an inner main groove of the two inner main grooves, which is in contact with the intermediate continuous land portion β, to the other inner main groove and being closed without communicating with the other inner main groove. Inclination directions of the second sipes and the third sipes with respect to the tire lateral direction and positions thereof in the tire circumference are preferably set, and the second sipes are positioned on extension lines of the third sipes.

As seen from the tread surface, first sipes b of the first sipes, which are provided in a region of the intermediate continuous land portion β, and the second sipes are preferably inclined to different directions in the tire circumferential direction as extending inward in the tire lateral direction.

As seen from the tread surface, the first sipes provided in the regions of the two intermediate continuous land portions are preferably inclined to different sides in the tire circumferential direction as extending inward in the tire lateral direction.

An outer land portion is preferably provided on an outer side of the outer main groove B of the two outer main grooves in the tire lateral direction. A circumferential auxiliary groove and outer lug grooves are preferably provided in a region of the outer land portion, the circumferential auxiliary groove formed in the entire circumference in the tire circumferential direction, the outer lug grooves extending in the tire lateral direction from the outer side in the tire lateral direction and being closed without communicating with the outer main groove B. The outer lug grooves preferably intersect the circumferential auxiliary groove.

According to the pneumatic tire described above, steering stability performance on dry road surfaces and steering stability performance on wet road surfaces can be improved compared to the related art, and pattern noise can be suppressed.

DETAILED DESCRIPTION

Hereinafter, a pneumatic tire of the present embodiment will be described in detail.

In the present specification, "tire lateral direction" refers to the direction of the center axis of rotation of a pneumatic tire. "Tire circumferential direction" refers to a rotation direction in which a tread surface rotates, when the tire rotates about the center axis of rotation of the tire. "Tire radial direction" refers to the direction radiating from the center axis of rotation of the tire. "Outward in the tire radial direction" refers to the direction away from the center axis of rotation of the tire. "Inward in the tire radial direction" refers to the direction towards the center axis of rotation of the tire. "Outward in the tire lateral direction" refers to the direction away from the tire equator line in the tire lateral direction. "Inward in the tire lateral direction" refers to the direction toward the tire equator line in the tire lateral direction.

Figure 1:
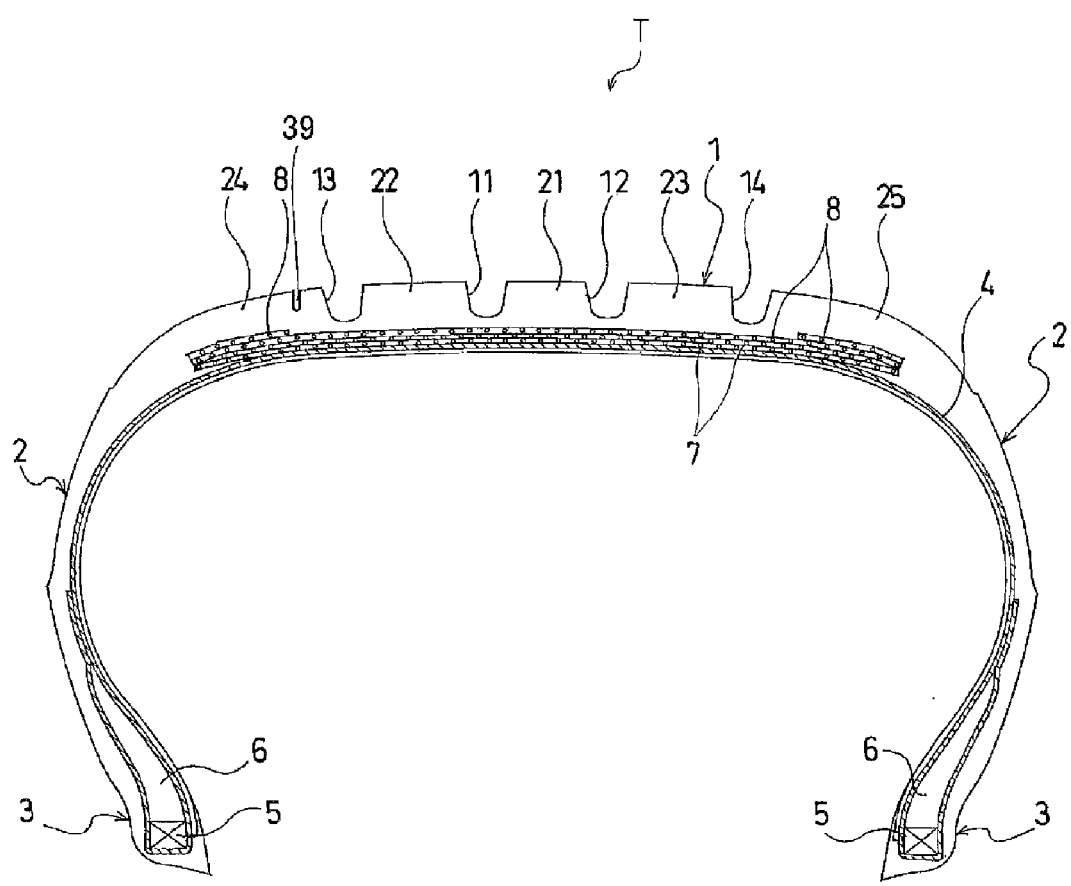
FIG. 1 is a profile cross-sectional view of a pneumatic tire according to an embodiment.

FIG. 1 is a profile cross-sectional view of the pneumatic tire according to an embodiment. A pneumatic tire T illustrated in FIG. 1 includes a tread portion 1 having an annular shape and extending in the tire circumferential direction, a pair of sidewall portions 2, 2 disposed on both sides of the tread portion 1, and a pair of bead portions 3, 3 disposed inward in the tire radial direction of the corresponding sidewall portions 2.

A carcass layer 4 is mounted between the pair of bead portions 3, 3. The carcass layer 4 includes a plurality of reinforcing cords extending in the tire radial direction and is folded back around bead cores 5 respectively disposed in the bead portions 3 from a tire inner side to a tire outer side. A bead filler 6, extending outward in the tire radial direction, having a triangular cross-sectional shape, and formed from a rubber composition, is disposed on the outer circumference of the bead core 5.

Meanwhile, a plurality of belt layers 7 are embedded outward in the tire radial direction of the carcass layer 4 in the tread portion 1. The belt layers 7 each include a plurality of reinforcing cords that are inclined with respect to the tire circumferential direction, the reinforcing cords being disposed between layers in a criss-cross manner. In the belt layers 7, the inclination angle of the reinforcing cords with respect to the tire circumferential direction falls within a range of from 10° to 40°, for example. Steel cords are preferably used as the reinforcing cords of the belt layers 7. To improve high-speed durability, at least one belt cover layer 8 is disposed outward in the tire radial direction of the belt layer 7, the belt cover layer 8 having reinforcing cords arranged at an angle of 5° or less, for example, with respect to the tire circumferential direction. Nylon, aramid, or similar organic fiber cords are preferably used as the reinforcing cords of the belt cover layer 8.

Note that the tire internal structure described above represents a typical example for a pneumatic tire, and the pneumatic tire is not limited thereto.

Figure 2:
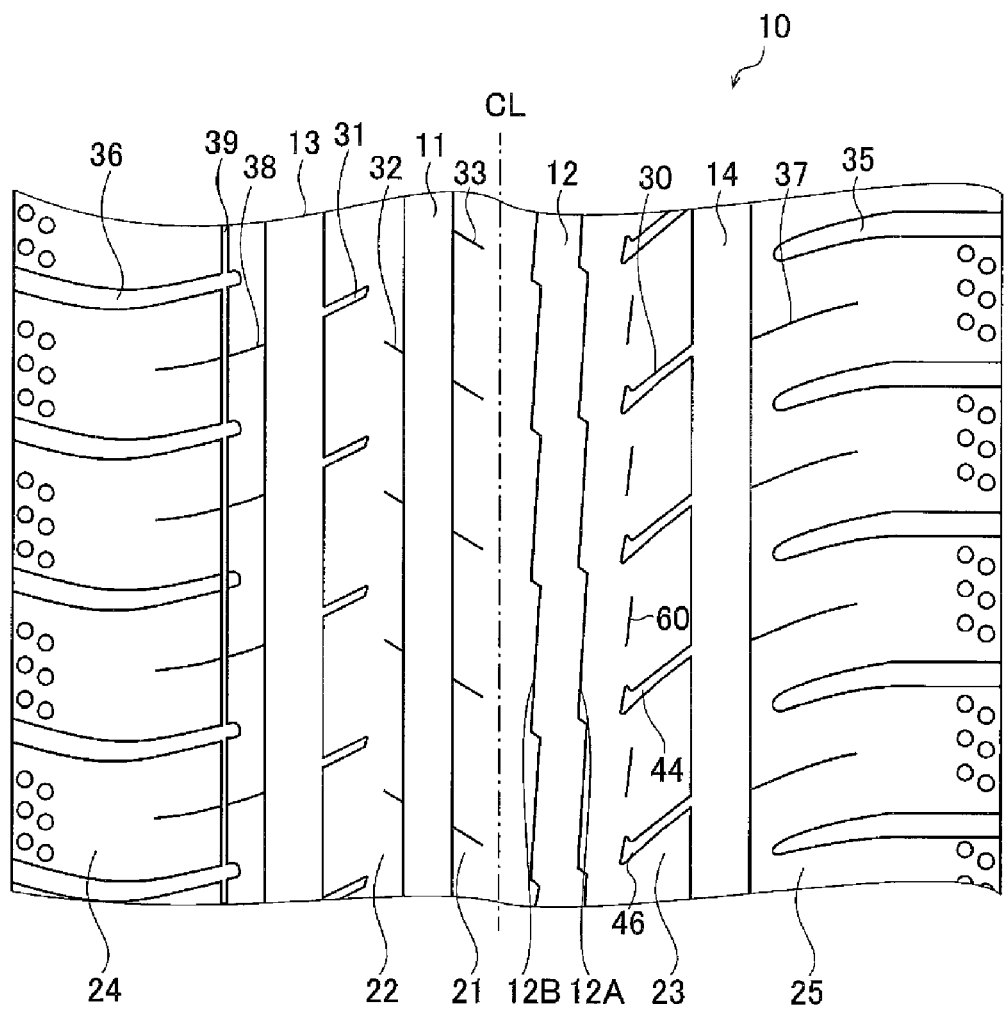
FIG. 2 is a developed view illustrating an example of a tread pattern of the pneumatic tire according to an embodiment.

FIG. 2 is a developed view illustrating an example of a tread pattern 10 of the pneumatic tire T according to an embodiment. The pneumatic tire T having the tread pattern 10 may be suitably used for a passenger vehicle.

In FIG. 2, a reference symbol CL denotes the tire center line (tire equator line).

The tread pattern 10 mainly includes center main grooves (inner main grooves) 11, 12, shoulder main grooves (outer main grooves) 13, 14, a center continuous land portion (inner continuous land portion) 21, intermediate continuous land portions 22, 23, and first sipes 30, 31.

The center main grooves 11, 12 are positioned on both sides in the tire lateral direction across a center line CL and are formed in the entire circumference of the tread portion 1 in the tire circumferential direction. Edges on both groove sides of the center main groove 12 include groove chamfered portions 12A, 12B, the groove chamfered portions 12A, 12B having a chamfered width changing in the tire circumferential direction so as to have a zigzag shape as seen from the tread surface of the tread portion 1. On the edges on both groove sides of the center main groove 12, one of the groove chamfered portions 12A, 12B has a chamfered width that is gradually increased to reach a predetermined width as extending in one direction in the tire circumferential direction, and another of the groove chamfered portions 12A, 12B further starts from a position substantially same as the reached position and has a chamfered width that is gradually increased from a chamfered width O to reach a predetermined width. By repeating this, the groove chamfered portions 12A, 12B are formed in the entire circumference of the center main groove 12 in the tire circumferential direction. On the edges on both groove sides of the center main groove 12, the chamfered width starts at the same position and ends at the same position in the tire circumferential direction, and hence the center main groove 12 has a zigzag shape as seen from the tread surface. However, the groove width of the center main groove 12 is kept a certain width, and the center main groove 12 is formed in the entire circumference. In the zigzag shape, regarding the position at which one of the groove chamfered portions 12A. 12B ends and another of the groove chamfered portions 12A, 12B starts, a dimension of a step on the edge in the tire lateral direction (length along the tire lateral direction) falls within a range of from 15% to 35% of the groove width of the center main groove 12, for example.

The center main groove 11 is not provided with a chamfered portion that is similar to those provided to the center main groove 12. The edges on both groove sides of the center main groove 11 extend linearly along the entire circumference of the tire in the tire circumferential direction.

The shoulder main grooves 13, 14 are provided so as to sandwich the center main grooves 11, 12 inward in the tire lateral direction and extend linearly along the entire circumference of the tread portion 1 in the tire circumferential direction without being bent or curved.

The groove width of the center main grooves 11, 12 and the shoulder main grooves 13, 14 falls within a range of from 5.0 mm to 15.0 mm, and the groove depth thereof falls within a range of from 6.5 mm to 9.0 mm, for example.

The center continuous land portion 21 is formed between the center main grooves 11, 12 and formed continuously in the entire circumference in the tire circumferential direction. The center line CL passes on the center continuous land portion 21.

The intermediate continuous land portion 22 is formed between the center main groove 11 and the shoulder main groove 13 and is formed outward in the tire lateral direction of the center continuous land portion 21 and formed in the entire circumference of the tread portion 1 in the tire circumferential direction. The intermediate continuous land portion 23 is also formed between the center main groove 12 and the shoulder main groove 14 and is formed outward in the tire lateral direction of the center continuous land portion 21 and formed in the entire circumference of the tread portion 1 in the tire circumferential direction.

In regions of the center continuous land portion 21 and the intermediate continuous land portion 22, lug grooves extending from the center main grooves 11, 12 or the shoulder main grooves 13, 14 are not provided at all and only sipes are provided. The lug groove referred herein indicates a lug groove having a groove width between groove walls exceeds 2 mm, at a position of 50% of each of positions in a groove depth direction.

The first sipes 30 are provided in a region of the intermediate continuous land portion 23, extend inward in the tire lateral direction from the shoulder main groove 14, and are closed in the region of the intermediate continuous land portion 23 without contact with the center main groove 12. The first sipes 31 are provided in a region of the intermediate continuous land portion 22, extend inward in the tire lateral direction from the shoulder main groove 13, and are closed in the region of the intermediate continuous land portion 22 without contact with the center main groove 11.

Shoulder land portions 24, 25 are provided outward in the tire lateral direction of the shoulder main grooves 13, 14. The shoulder land portions 24, 25 are provided with a plurality of shoulder lug grooves 35, 36, respectively. The shoulder lug grooves 35, 36 extend inward in the tire lateral direction from the tread pattern ends on both sides in the tire lateral direction, are closed in the regions of the shoulder land portions 24, 25 without contact with the shoulder main grooves 13, 14, and are disposed at a predetermined interval in the tire circumferential direction. Shoulder sipes 37, 38 are provided between the shoulder lug grooves 35, 36 adjacent to each other in the tire circumferential direction.

The shoulder sipes 37, 38 are provided inward in the tire lateral direction from the regions of the shoulder land portions 24, 25 so as to be parallel with the shoulder lug grooves 35, 36 and are in contact with the shoulder main grooves 13, 14.

In such tread pattern 10, the first sipes 30, 31 each include: a sipe main body portion 40 on a sipe bottom side in a depth direction of the first sipes 30, 31, a distance between sipe wall surfaces in the sipe main body portion 40 being constant (see FIG. 4A); and a sipe chamfered portion 42 on a side of the tread surface of the first sipes 30, 31, the sipe chamfered portion 42 having the sipe wall surfaces inclined so as to open to the tread surface. That is, the first sipes 30, 31 are so-called chamfered sipes.

A depth of the first sipes 30, 31 falls within a range of from 5.5 mm to 8.5 mm, for example. The depth of the first sipes 30, 31 is shallower than the groove depth of the center main grooves 11, 12 and shoulder main grooves 13, 14, and the distance between the sipe wall surfaces of the sipe main body portion 40 falls within a range from 0.3 mm to 0.9 mm, for example. Generally, the distance between the sipe wall surfaces of the sipe falls within a range from 0.3 mm to 0.9 mm in a case where the sipe wall surfaces are parallel with each other. This distance is narrower than the groove width of the main grooves such as the center main grooves 11, 12 and the shoulder main grooves 13, 14. The sipe and the main groove can be distinguished from each other by a difference in a distance between parallel sipe wall surfaces and in a dimension of a groove width.

As described above, lug grooves are not formed in the regions of the intermediate continuous land portions 22, 23. Thus, the degradation of tread rigidity of the intermediate continuous land portions 22, 23 is suppressed, and steering stability performance on dry road surfaces is improved. Further, lug grooves are not formed in the center continuous land portion 21, and the degradation of tread rigidity is suppressed. Thus, steering performance at the initial stage of steering on dry road surfaces can also be improved. Meanwhile, the first sipes 30, 31 provided in the intermediate continuous land portions 22, 23 are chamfered sipes, and hence water flows easily on the sipe chamfered portion 42 as compared to sipes without a sipe chamfered portion in the related art. Further, since a part of the sipe chamfered portion 42 functions as an edge and since the center main groove 12 is provided with the groove chamfered portions 12A, 12B and the center main groove 12 forms a zigzag shape, which functions as an edge, steering stability performance on wet road surfaces is improved. Further, since lug grooves are not formed in the regions of the intermediate continuous land portions 22, 23 and the center continuous land portion 21 and since blocks are not formed by cutting the continuous land portion, pattern noise caused due to lug grooves is not caused. Thus, pattern noise is also reduced.

In order to improve steering stability performance on wet road surfaces, an inclination angle θ of the sipe wall surfaces of the first sipes 30, 31 with respect to the sipe depth direction (see FIGS. 4A and 4B) preferably falls within a range of from 20 degrees to 80 degrees, for example. In the first sipes 30, 31, the length of the sipe chamfered portion 42 in the sipe depth direction is preferably constant regardless of a position of the first sipes 30, 31 in the extension direction and preferably falls within a range of from 25% to 60% of the length in the sipe depth direction (length from the tread surface to the sipe bottom), for example. Therefore, in the first sipes 30, 31, a length in the sipe depth direction, as seen from the tread surface, of a joint position of the sipe chamfered portion 42 and the sipe main body portion 40 is preferably constant regardless of a position of the first sipes 30, 31 in the extension direction.

Figure 3A:
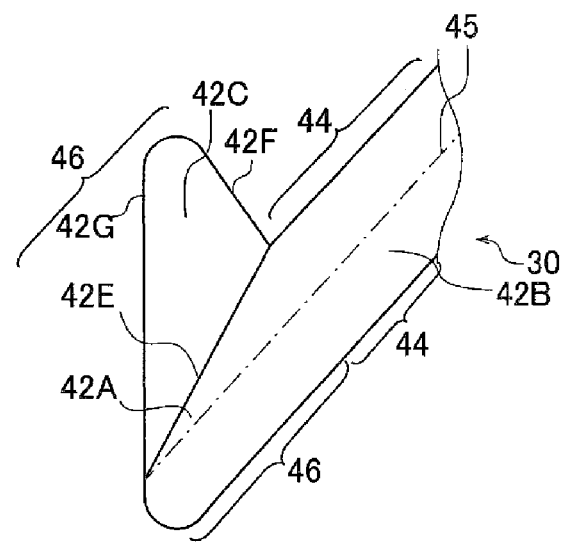
FIGS. 3A and 3B are enlarged plan views illustrating an example of a first sipe illustrated in FIG. 2.
Figure 3B:
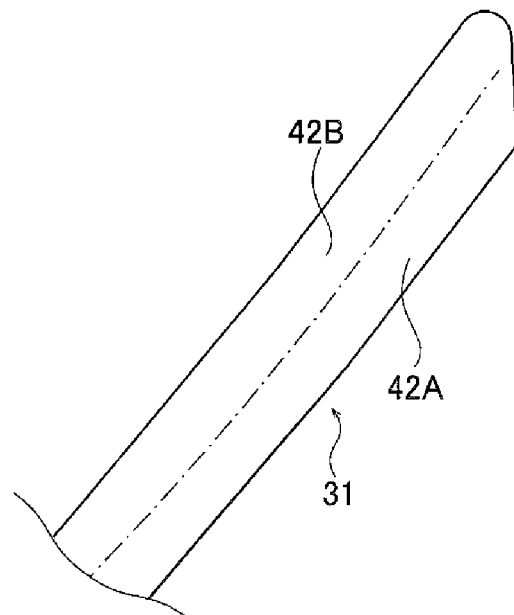
Figure 4A:
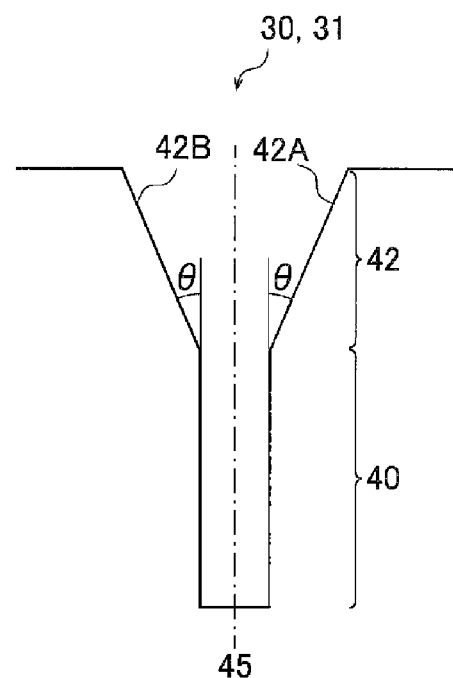
FIGS. 4A and 4B are cross-sectional views of an example of the first sipe illustrated in FIG. 3A.
Figure 4B:
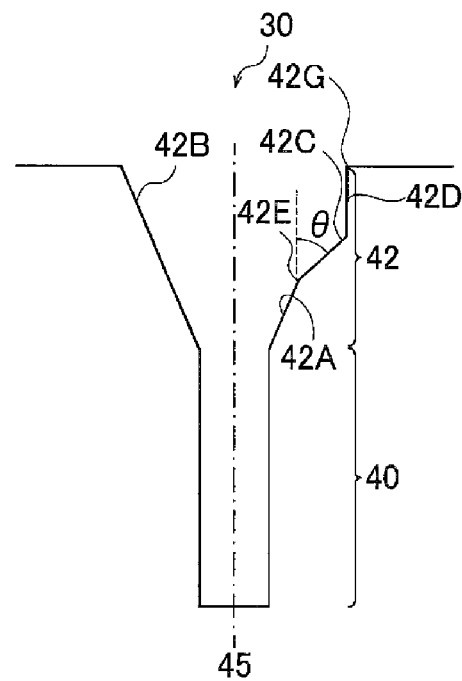
Figure 5:
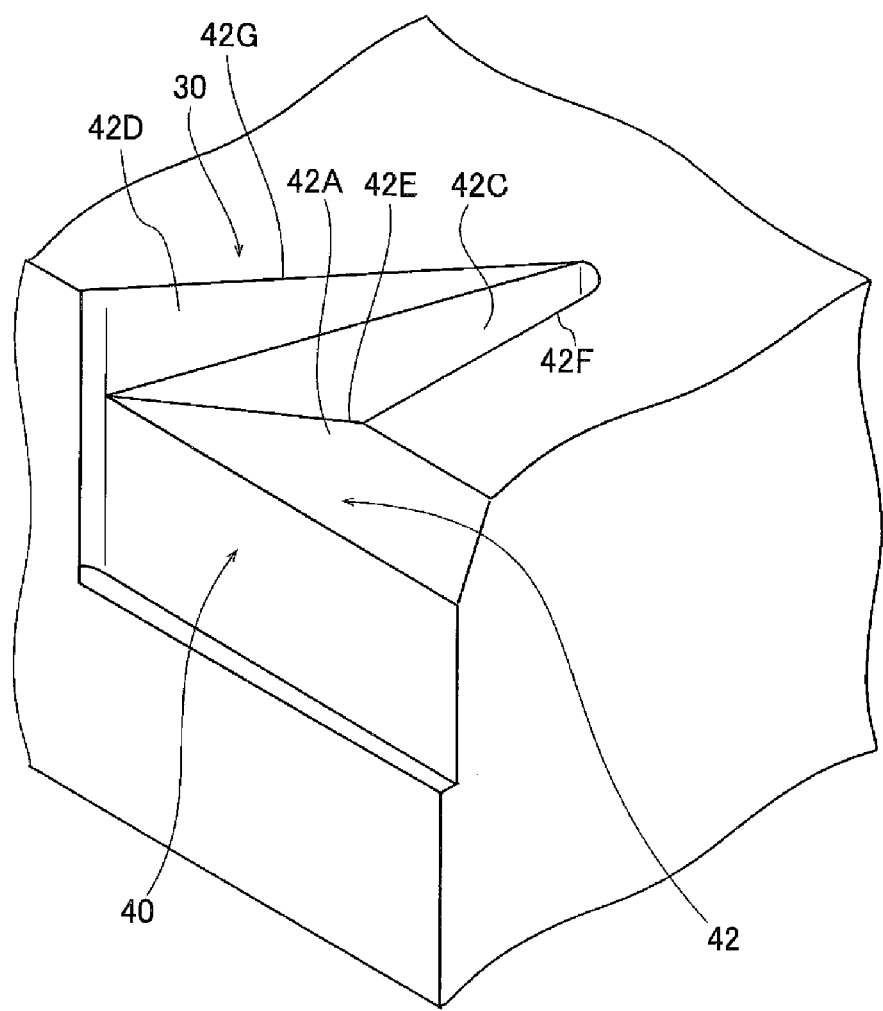
FIG. 5 is a perspective view of an example of the first sipe when the first sipe illustrated in FIG. 3A is cut along a sipe center line.
Figure 6:
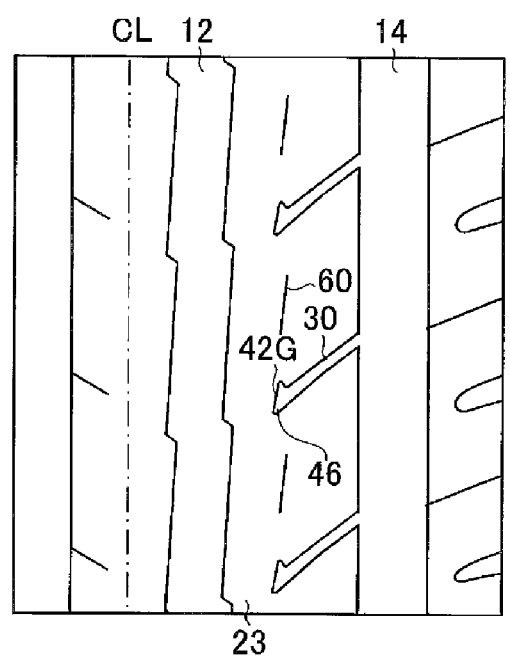
FIG. 6 is an enlarged plan view illustrating main parts of the tread pattern illustrated in FIG. 2.

FIGS. 3A and 3B are enlarged plan views illustrating an example of the first sipes 30, 31 in a preferred embodiment. FIGS. 4A and 4B are cross-sectional views of an example of the first sipes 30, 31 illustrated in FIG. 3A. FIG. 5 is a perspective view of an example when the first sipe 30 illustrated in FIG. 3A is cut along a sipe center line 45. FIG. 6 is an enlarged plan view illustrating main parts of the treat pattern 10.

As illustrated in FIG. 2, the first sipes 30, 31 extend so as to be inclined in the tire lateral direction from the shoulder main grooves 13, 14 on a side of the center continuous land portion 21 and are provided so as to be closed in the regions of the intermediate continuous land portions 22, 23. Of the first sipes 30, 31, a surface contour shape, which is seen from the tread surface, of each of the first sipes 30 (first sipes a) extending from the shoulder main groove 14 (shoulder main groove A) includes: an extending portion 44 extending constantly in an extension direction or with smooth change from the shoulder main groove 14 (see FIG. 2 and FIG. 3A); and a bent portion 46 being provided at a closed end portion of the first sipe 30 and extending from the extending portion 44 in a bent manner to a direction opposite the direction to which the extending portion 44 extends in the tire circumferential direction.

A bent shape similar to the bent portion 46 is not provided at a closed end portion of the first sipe 31. The first sipe 31 extends from the shoulder main groove 13 constantly in an extension direction or with smooth change and is closed in the region of the intermediate continuous land portion 22 without contact with the center main groove 11. In this case, in the sipe depth direction, the sipe main body portion 40 and the sipe chamfered portion 42 extend to the closed end portion with a cross-sectional shape the same as that of the extending portion 44. The inclination angle of the chamfered surface of the sipe chamfered portion 42 with respect to the sipe depth direction remains as a constant angle without being changed.

In this case, according to an embodiment, as illustrated in FIG. 4B and FIG. 5, preferably in the bent portion 46 of the first sipe 30, the sipe main body portion 40 extends constantly in an extension direction or with smooth change from the extending portion 44 without being bent and is closed, whereas the sipe chamfered portion 42 forms a bent shape of the bent portion.

Specifically, the bent shape of the bent portion 46 is preferably formed by changing an inclination angle θ of a chamfered surface 42A of the sipe chamfered portion 42 with respect to the depth direction of the first sipe 30 (see FIG. 4B). That is, a sipe wall surface on one side of the two sipe wall surfaces has the chamfered surface (first chamfered surface) 42A and a chamfered surface (second chamfered surface) 42C, which have different inclination angles with respect to the depth direction of the first sipe, at different positions in the sipe depth direction. As described above, the bent shape of the bent portion 46 is formed.

As illustrated in FIG. 4A, a sipe cross-sectional shape at the extending portion 44 of the first sipe 30 has a left-right symmetric shape with respect to a sipe center line 45. The sipe chamfered portion 42 of the extending portion 44 is formed of the chamfered surface 42A and a chamfered surface 42B that face each other. The chamfered surface 42A and the chamfered surface 42B have the same inclination angle θ and are inclined to different directions with respect to the sipe depth direction. The chamfered surface 42A and the chamfered surface 42B are flat surfaces but may be curved surfaces that are curved so as to be smoothly convex or concave with respect to a space between the sipe wall surfaces.

In contrast, as illustrated in FIG. 4B, a sipe cross-sectional shape at the bent portion 46 is asymmetric with respect to the sipe center line 45. The sipe chamfered portion 42 of the bent portion 46 is formed of the chamfered surface 42A and the chamfered surface 42B facing each other, the chamfered surface 42C, and a wall surface 42D. The chamfered surface 42A and the chamfered surface 42B have the same inclination angle θ but are inclined to different directions with respect to the sipe depth direction. The chamfered surface 42C is provided on the same side and is inclined to the same side as the chamfered surface 42A. The inclination angle θ of the chamfered surface 42C is different from that of the chamfered surface 42A. According to an embodiment, the inclination angle θ of the chamfered surface 42C is preferably larger than the inclination angle θ of the chamfered surface 42A. According to an embodiment, the chamfered surface 42C is preferably positioned on a side of the tread surface with respect to the chamfered surface 42A. By adopting such a configuration, the space between the facing chamfered surfaces of the sipe chamfered portion 42 can be largely secured. Therefore, the chamfered surface 42A and the chamfered surface 42C is joined via a ridge line 42E. The chamfered surface 42C is a flat surface inclined from the tread surface in a direction toward a distal end of the closed end portion of the sipe main body portion 40 of the first sipe 30. As illustrated in FIG. 3A, a surface contour shape of the bent portion 46 has an arrow shape, and edges held in contact with the tread surface, shaping the arrow shape, are ridge lines 42F, 42G. The chamfered surface 42C is joined to the tread surface via the ridge line 42F. Therefore, the chamfered surface 42C is inclined from the ridge line 42F to the position of the distal end of the closed end portion, which is the uppermost position of the sipe main body portion 40 in the sipe depth direction (joint position between the chamfered surface 42A and the sipe wall surface of the sipe main body portion 40). Meanwhile, the wall surface 42D is joined to the tread surface via the ridge line 42G and extends to the chamfered surface 42C at an inclination angle falling within a range of from 0 degrees to 60 degrees with respect to the sipe depth direction. That is, the wall surface 42D is a steep inclined surface as seen from the tread surface similarly to the sipe wall surface of the sipe main body portion 40. As illustrated in FIG. 2 and FIG. 6, such ridge line 42G forms an edge of the arrow shape of the bent portion 46 bent from the extending portion 44 in the tire circumferential direction. Therefore, the ridge line 42G can exert an edge effect. Note that the chamfered surface 42A, the chamfered surface 42B, the chamfered surface 42C, and the wall surface 42D are flat surfaces but may be curved surfaces that are curved so as to be smoothly convex or concave with respect to a space between the sipe wall surfaces.

According to an embodiment, as illustrated in FIG. 4B, the chamfered surfaces 42A, 42C being the sipe wall surfaces on one side of the first sipe 30 preferably have different inclination angles θ with respect to the depth direction of the first sipe 30 so as to form the bent shape of the bent portion 46. With this, the inclination angle θ of the chamfered surface 42C can be larger than the inclination angle θ of the chamfered surface 42B, and a large space can be secured in the bent portion 46. Thus, water on wet road surfaces is more likely to flow in this space and is drained to the shoulder main groove 14 through the sipe chamfered portion 42, which contributes to drainage performance. Thus, steering stability performance on wet road surfaces can be improved.

According to an embodiment, the inclination angle θ of the chamfered surface 42A is preferably the same as that of the facing chamfered surface 42B. With this, a portion near the first sipe 30 in the intermediate continuous land portion 23 can be prevented from being deformed in an extremely asymmetric manner, and block chipping can be suppressed.

Further, according to an embodiment, the chamfered width of the two chamfered surfaces 42A and 42C is preferably reduced toward the closed end of the sipe main body portion 40. As illustrated in FIG. 4B, the positions of the chamfered surfaces 42A, 42C in the depth direction from the tread surface are deeper as approaching to the distal end of the closed end of the sipe main body portion 40, and the chamfered width thereof is reduced as approaching to the distal end of the closed end of the sipe main body portion 40. Thus, the degradation of the tread rigidity of the intermediate continuous land portion 23 can be suppressed, and the degradation of steering stability on dry road surfaces can be suppressed.

As illustrated in FIG. 6, in the region of the intermediate continuous land portion 23 (intermediate continuous land portion α) in which the first sipes 30 (first sipes a) are provided, narrow grooves 60 that do not communicate with the bent portions 46 are provided intermittently in the tire circumferential direction. According to an embodiment, the extension direction of the narrow groove 60 is preferably parallel with the extension direction of the ridge line 42G being an edge of the surface contour shape of the bent portion 46 on the center main groove 12 side. The edge of the ridge line 42G and the edge of the narrow groove 60 are parallel with each other, and thus the orientation of the edge components can be aligned, which increases an edge effect. Thus, steering stability performance on wet road surfaces can be improved. The groove width of the narrow groove 60 falls within a range from 0.2 mm to 1.0 mm, for example, and the groove depth thereof falls within a range of from 2.0 mm to 4.0 mm, for example. Thus, the narrow groove 60 can be distinguished from a lug groove and a main groove by its groove depth and groove width.

According to an embodiment, the pneumatic tire T preferably has a specified mounting direction with respect to a vehicle. This specification of the mounting direction is indicated as information with characters, symbols, or the like on a sidewall surface of the pneumatic tire T. In this case, the mounting direction is preferably specified so that the shoulder main groove 14 (shoulder main groove A) and the center main groove 12 in a zigzag shape are positioned on the vehicle outer side with respect to the shoulder main groove 13 (shoulder main groove B) and the center main groove 11. A heavy load is applied to a cornering outer side of the pneumatic tire at the time of cornering, which largely affects steering stability performance. On such cornering outer side of the pneumatic tire, the edge components of the center main groove 12 in a zigzag shape, the first sipes 30, and the narrow grooves 60, which are positioned on the vehicle outer side with respect to the center line CL, further improves steering stability performance on wet road surfaces.

Further, as illustrated in FIG. 2, in the region of the intermediate continuous land portion 22 (intermediate continuous land portion β), second sipes 32, which extend from the center main groove 11 and are closed without contact with the shoulder main groove 13, are provided, and third sipes 33, which extend from the center main groove 11 held in contact with the intermediate continuous land portion 22 to the center main groove 12 on the opposite side and are closed without contact with the center main groove 12 on the opposite side, are further provided. In this case, according to an embodiment, as illustrated in FIG. 2, inclination angles of the second sipes 32 and the third sipes 33 with respect to the tire lateral direction and positions thereof in the tire circumference are preferably set so that the second sipes 32 are positioned on the extension lines of the third sipes 33. With this, the second sipe 32 and the third sipe 33 act like one sipe, and an edge effect is exerted in a concentrated manner. Thus, braking and driving performance on wet road surfaces can be improved. Each of the second sipes 32 and the third sipes 33 is a sipe configured without a sipe chamfered portion, which has facing sipe wall surfaces parallel with each other at any position in the sipe depth direction.

Further, as seen from the tread surface, the first sipes 31 (first sipes b) and the second sipes 32 formed in the region of the intermediate continuous land portion 22 (intermediate continuous land portion β) are preferably inclined to different directions in the tire circumferential direction with respect to a direction toward the same side in the tire lateral direction (the left side or the right side on the drawing sheet of FIG. 2). That is, the first sipe 31 and the second sipe 32 form a chevron shape. With this, even when the pneumatic tire T is at a positive slip angle or a negative slip angle, steering stability performance and braking and driving performance on wet road surfaces can be effectively exerted.

As seen from the tread surface, the first sipes 30, 31 are preferably inclined to the same direction in the tire circumferential direction with respect to a direction toward the same side in the tire lateral direction (the left side or the right side on the drawing sheet of FIG. 2). In other words, it can be said that, as seen from the tread surface, the first sipes 30, 31 are inclined to different sides in the tire circumferential direction as extending inward in the tire lateral direction. In the example illustrated in FIG. 2, the first sipes 30, 31 extend right upward from the lower left or extend left downward from the upper right on the drawing sheet. The inclination angle of the first sipes 30, 31 with respect to the tire circumferential direction preferably falls within a range of from 25 degrees to 75 degrees. When the inclination angle is less than 25 degrees, in the vicinities of the connection portions in which the first sipes 30, 31 are in contact with the shoulder main grooves 13, 14, the tread rigidity of the intermediate continuous land portion 23 is locally degraded, and steering stability performance on dry road surfaces is more likely to be degraded, which is more likely to be a main cause for uneven wear. When the inclination angle is more than 75 degrees, the tread rigidity of the intermediate continuous land portion 23 in the tire circumferential direction is degraded, and steering stability performance on dry road surfaces is more likely to be degraded.

Further, as illustrated in FIG. 2, in the region of the shoulder land portion 24, a circumferential auxiliary groove 39 formed in the entire circumference in the tire circumferential direction and the shoulder lug grooves 36 are provided. The shoulder lug grooves 36 extend in the tire lateral direction from an outer side in the tire lateral direction and are closed without communicating with the shoulder main groove 13 (shoulder lug groove B). In this case, the shoulder lug grooves 36 preferably intersect the circumferential auxiliary groove 39. The circumferential auxiliary groove 39 prevents the tread rigidity of the shoulder land portion 24 from being excessively increased and adjusts a ground contact area of the shoulder land portion. Particularly, when the shoulder land portion 24 is mounted to a vehicle so as to be oriented to a vehicle inner side, a ground contact area of the tire can be increased to reduce a ground contact pressure due to an effect of an camber (negative camber). Thus, wear of the shoulder land portion 24 can be suppressed.

The groove width of the circumferential auxiliary groove 39 falls within a range from 0.8 mm to 3.0 mm, for example, and the groove depth thereof falls within a range from 1.0 mm to 4.5 mm, for example.

EXPERIMENT

In order to confirm the effects of the pneumatic tire T according to the present embodiment, pneumatic test tires having various tread patterns were produced and subjected to performance evaluation. Specifically, each produced pneumatic test tire had a tire size of 225/50R17 98W. Each produced pneumatic test tire was mounted to a rim (rim size of 17×7.5 J) and was mounted to a test vehicle (front wheel drive vehicle with engine displacement of 2400 cc) under a condition of an air pressure of 230 kPa. The test vehicle traveled on a test course road surface, and evaluation on steering stability performance on dry road surfaces and steering stability performance on wet road surfaces and evaluation on a magnitude of pattern noise were performed.

With regard to evaluation on steering stability performance on dry road surfaces, while performing steering on dry road surfaces, a driver performed sensory evaluation on response corresponding to steering, and Conventional Example was indexed as an index value of 100. Larger index values indicate better performance.

With regard to evaluation on steering stability performance on wet road surfaces, a travel time required for traveling on a predetermined range of wet road surfaces on which rainy weather conditions were reproduced was measured, and a multiplicative inverse thereof was indexed. A multiplicative inverse of a measured travel time in Conventional Example was set as an index value of 100. Thus, larger index values indicate better performance.

With regard to evaluation on pattern noise, sensory evaluation was performed on a magnitude of pattern noise sensed by a driver at the time of causing a vehicle to travel under a predetermined speed condition. Evaluation was performed by indexing Conventional Example as an index value of 100. Larger index values indicate lower pattern noise.

The produced pneumatic test tires T each had a tire structure illustrated in FIG. 1.

A tread pattern of the pneumatic tire in Conventional Example had a tread pattern illustrated in FIG. 2 except for providing lug grooves in place of the first sipes 30, 31 in the tread pattern illustrated in FIG. 2. The groove width of the lug grooves was set to 4.6 mm.

In Comparative Example, the tread pattern illustrated in FIG. 2 was set as a basic pattern in which the first sipes 30, 31 were provided, but the sipes were each formed of the sipe main body portion 40 that was not provided with the sipe chamfered portion 42 and that had a constant distance between the facing sipe wall surfaces in the sipe depth direction. The distance between the sipe wall surfaces was set to the same as that in the sipe main body portion 40 in Examples described below. The sipe depths of the first sipes 30, 31 was set to 5.7 mm, the distance between the sipe wall surfaces of the sipe main body portion 40 was set to 0.6 mm, the inclination angle θ of the chamfered surfaces 42A, 42B was set to 25 degrees, the inclination angle θ of the chamfered surface 42C was set to 45 degrees, and the maximum distance between the facing sipe wall surfaces of the sipe chamfered portion 42 of the bent portion 46 was set to 5.5 mm.

In Example 1 without the bent portion 46, the tread pattern illustrated in FIG. 2 was set as a basic pattern. The distal end of the first sipe 30 had a shape similar to the closed end of the first sipe 31 (see FIG. 3B). In Examples 2 to 6, the tread pattern illustrated in FIG. 2 was set as a basic pattern.

Both in Conventional Example and Examples, the edge portions of the center main groove 12 were provided with groove chamfered portions and had a zigzag shape. A "chamfered depth" in Tables 1 and 2 indicates a ratio of the depth of the sipe chamfered portion 42 (a length from the tread surface to the deepest position of the sipe chamfered portion 42) with respect to the sipe depth of the first sipes 30, 31 (a total depth of the sipe main body portion 40 and the sipe chamfered portion 42).

The groove width and the groove depth of the center main grooves 11, 12 were set to 9.3 mm and 8.3 mm, respectively, the groove width and the groove depth of the shoulder main grooves 13, 14 were set to 11.3 mm, and the maximum groove width and the maximum groove depth of the shoulder lug grooves 35, 36 were set to 5.5 mm and 5.2 mm, respectively.

improved by setting the depth of the sipe chamfered portion 42 to a depth from 0.2 to 0.6 times larger than the total depth of the sipe main body portion 40 and the sipe chamfered portion 42 of each of the first sipes 30, 31.

From Examples 2, 5, and 6, it can be seen that steering stability performance on dry road surfaces and wet road surfaces was improved and pattern noise was reduced in a case where the inclination angle of the first sipes 30, 31 with respect to the shoulder main grooves 13, 14 fell in a range from 25 degrees to 75 degrees.

This clearly demonstrates the effect of the pneumatic tire T according to the present embodiment.

While the pneumatic tire according to the embodiments of the present technology is described above in detail, the present technology is not limited to the above embodiments and may be improved or modified in various ways within a range without departing from the essence of the present technology as a matter of course.

TABLE 1

|  | Conventional Example | Comparative Example | Example 1 | Example 2 | Example 3 |
|---|---|---|---|---|---|
| Presence of lug grooves in regions of the intermediate continuous land portions 22, 23 | Yes | No | No | No | No |
| Presence of the first sipes 30, 31 | No | Yes | Yes | Yes | Yes |
| Presence of the sipe chamfered portion 42 | No | No | Yes | Yes | Yes |
| Presence of the bent portion 46 | No | No | No | Yes | Yes |
| Depth of the sipe chamfered portion 42 | — | — | 0.4 | 0.4 | 0.2 |
| Inclination angle of the first sipes 30, 31 with respect to the shoulder main grooves 13, 14 | — | 50 degrees | 50 degrees | 50 degrees | 50 degrees |
| Steering stability performance on dry road surface | 100 | 105 | 105 | 105 | 110 |
| Steering stability performance on wet road surfaces | 100 | 100 | 105 | 108 | 102 |
| Pattern noise | 100 | 105 | 105 | 105 | 107 |

TABLE 2

|  | Example 4 | Example 5 | Example 6 |
|---|---|---|---|
| Presence of lug grooves in regions of the intermediate continuous land portions 22, 23 | No | No | No |
| Presence of the first sipes 30, 31 | Yes | Yes | Yes |
| Presence of the sipe chamfered portion 42 | Yes | Yes | Yes |
| Presence of the bent portion 46 | Yes | Yes | Yes |
| Depth of the sipe chamfered portion 42 | 0.6 | 0.4 | 0.4 |
| Inclination angle of the first sipes 30, 31 with respect to the shoulder main grooves 13, 14 | 50 degrees | 25 degrees | 75 degrees |
| Steering stability performance on dry road surface | 102 | 102 | 102 |
| Steering stability performance on wet road surfaces | 110 | 105 | 105 |
| Pattern noise | 102 | 105 | 105 |

As compared to Conventional Example, it can be seen that, in all of Examples 1 to 6, steering stability performance on dry road surfaces and wet road surfaces was improved and pattern noise was reduced.

From comparison between Comparative Example and Example 1, it can be seen that steering stability performance on wet road surfaces was improved by providing the sipe chamfered portion 42 to the first sipe 30.

From comparison between Example 1 and Example 2, it can be seen that steering stability performance on wet road surfaces was improved by providing the bent portion 46 to the first sipe 30.

From Examples 2 to 4, it can be seen that steering stability performance on dry road surfaces and wet road surfaces was

The invention claimed is:

1. A pneumatic tire, comprising:
   a tread portion extending in a tire circumferential direction, having an annular shape, and having a tread pattern, wherein
   the tread pattern comprising:
   two inner main grooves being positioned on both sides in a tire lateral direction with respect to a tire equator line of the pneumatic tire and being formed in an entire circumference in the tire circumferential direction;
   two outer main grooves being provided and sandwiching the two inner main grooves on an inner side in the tire lateral direction;

an inner continuous land portion being sandwiched between the two inner main grooves and being continuously formed in the entire circumference in the tire circumferential direction;

two intermediate continuous land portions being sandwiched between one of the two inner main grooves and one of the two outer main grooves and between the other one of the two inner main grooves and the other one of the two outer main grooves, respectively, the two intermediate continuous land portions being continuously formed in the entire circumference in the tire circumferential direction, the two intermediate continuous land portions being outward in the tire lateral direction of the inner continuous land portion; and first sipes being provided in regions of the two intermediate continuous land portions and extending inward in the tire lateral direction from the two outer main grooves, regions of the inner continuous land portion and the two intermediate continuous land portions being not provided with lug grooves extending from the two inner main grooves or the two outer main grooves, edges on both sides of one of the two inner main grooves each comprising a groove chamfered portion having a chamfered width changing in the tire circumferential direction and forming a zigzag shape as seen from a tread surface of the tread portion, and the first sipes each including:

a sipe main body portion having a constant distance between sipe wall surfaces on a sipe bottom side in a depth direction of the first sipes; and a sipe chamfered portion inclined so that the sipe wall surfaces are open to the tread surface on a side of the tread surface of the first sipes, the sipe chamfered portion including, along an extending direction of the first sipe, a symmetric shape portion where two facing sipe wall surfaces of the sipe chamfered portion are arranged being symmetric with respect to a sipe center line of the first sipe, and an asymmetric shape portion where the two facing sipe wall surfaces are arranged being asymmetric with respect to the sipe center line, and in the asymmetric shape portion, one of the two facing sipe wall surfaces having a gradual inclined surface that inclines with respect to the tread surface gradually compared to an other of the two facing sipe wall surfaces.

2. The pneumatic tire according to claim 1, wherein a sipe wall surface being one of the two facing sipe wall surfaces comprises a first chamfered surface and a second chamfered surface at different positions in a sipe depth direction, an inclination angle of each of the first chamfered surface and the second chamfered surface with respect to the depth direction of the first sipes being different each other, and the sipe chamfered portion forms a bent shape of the bent portion.

3. The pneumatic tire according to claim 2, wherein the inclination angle of the first chamfered surface is identical to that of a counter chamfered surface opposing the first chamfered surface.

4. The pneumatic tire according to claim 2, wherein the inclination angle of the second chamfered surface is larger than the inclination angle of the first chamfered surface.

5. The pneumatic tire according to claim 4, wherein the second chamfered surface is positioned on the side of the tread surface with respect to the first chamfered surface.

6. The pneumatic tire according to claim 2, wherein a chamfered width of the two facing chamfered surfaces is reduced as approaching to a closed end of the sipe main body portion.

7. The pneumatic tire according to claim 1, wherein the first sipes are provided to be inclined in the tire lateral direction from the two outer main grooves to the inner continuous land portion and to be closed in the regions of the two intermediate continuous land portions, as seen from the tread surface, a surface contour shape of each of first sipes a of the first sipes, which extends from an outer main groove A being one of the two outer main grooves, comprises:

an extending portion extending constantly in an extension direction or with smooth change from the outer main groove A; and a bent portion provided on a side of a closed end portion of each of the first sipes a, the bent portion bending each of the first sipes a from the extending portion and extending to a direction opposite a direction to which the extending portion extends in the tire circumferential direction, in the bent portion, the sipe main body portion extends from the extending portion constantly in the extension direction or with smooth change without being bent and is closed, and the sipe chamfered portion forms a bent shape of the bent portion, and narrow grooves each being prevented from communicating with the bent portion are formed intermittently in the tire circumferential direction in a region of an intermediate continuous land portion $\alpha$ of the two intermediate continuous land portions in which the first sipes a are provided, and an extension direction of the narrow grooves is parallel with an extension direction of an edge of the surface contour shape on a side of the two inner main grooves.

8. The pneumatic tire according to claim 1, wherein the first sipes are provided to be inclined in the tire lateral direction from the two outer main grooves to the inner continuous land portion and to be closed in the regions of the two intermediate continuous land portions, as seen from the tread surface, a surface contour shape of each of first sipes a of the first sipes, which extends from an outer main groove A being one of the two outer main grooves, comprises:

an extending portion extending constantly in an extension direction or with smooth change from the outer main groove A; and a bent portion provided on a side of a closed end portion of each of the first sipes a, the bent portion bending each of the first sipes a from the extending portion and extending to a direction opposite a direction to which the extending portion extends in the tire circumferential direction, in the bent portion, the sipe main body portion extends from the extending portion constantly in the extension direction or with smooth change without being bent and is closed, and the sipe chamfered portion forms a bent shape of the bent portion, the pneumatic tire has a mounting direction that is specified with respect to a vehicle, and the outer main groove A is instructed, +−by the mounting direction, to be positioned on an outer vehicle side with respect to an outer main groove B of the two outer main grooves, the outer main groove B being different from the outer main groove A.

9. The pneumatic tire according to claim 1, wherein
the first sipes are provided to be inclined in the tire lateral direction from the two outer main grooves to the inner continuous land portion and to be closed in the regions of the two intermediate continuous land portions,
as seen from the tread surface, a surface contour shape of each of first sipes a of the first sipes, which extends from an outer main groove A being one of the two outer main grooves, comprises:
an extending portion extending constantly in an extension direction or with smooth change from the outer main groove A; and
a bent portion provided on a side of a closed end portion of each of the first sipes a, the bent portion bending each of the first sipes a from the extending portion and extending to a direction opposite a direction to which the extending portion extends in the tire circumferential direction,
in the bent portion, the sipe main body portion extends from the extending portion constantly in the extension direction or with smooth change without being bent and is closed, and the sipe chamfered portion forms a bent shape of the bent portion,
second sipes are provided in a region of an intermediate continuous land portion (3 of the two intermediate continuous land portions, which is sandwiched between an outer main groove of the two outer main grooves different from the outer main groove A and one of the two inner main grooves, the second sipes extending from one of the two inner main grooves and being closed without communicating with the outer main groove,
third sipes are provided in the region of the inner continuous land portion, the third sipes extending from an inner main groove of the two inner main grooves, which is in contact with the intermediate continuous land portion (3, to the other inner main groove and being closed without communicating with the other inner main groove, and
inclination directions of the second sipes and the third sipes with respect to the tire lateral direction and positions thereof in the tire circumference are set, and the second sipes are positioned on extension lines of the third sipes.

10. The pneumatic tire according to claim 8, wherein,
second sipes are provided in a region of an intermediate continuous land portion β of the two intermediate continuous land portions, which is sandwiched between an outer main groove of the two outer main grooves different from the outer main groove A and one of the two inner main grooves, the second sipes extending from one of the two inner main grooves and being closed without communicating with the outer main groove,
second sipes are provided in a region of an intermediate continuous land portion β of the two intermediate continuous land portions, which is sandwiched between the outer main groove different from the outer main groove A and one of the two inner main grooves, the second sipes extending from one of the two inner main grooves and being closed without communicating with the outer main groove,
as seen from the tread surface, first sipes b of the first sipes, which are provided in a region of the intermediate continuous land portion β, and the second sipes are inclined to different directions in the tire circumferential direction as extending inward in the tire lateral direction.

11. The pneumatic tire according to claim 1, wherein, as seen from the tread surface, the first sipes provided in the regions of the two intermediate continuous land portions are inclined to different sides in the tire circumferential direction as extending inward in the tire lateral direction.

12. The pneumatic tire according to claim 1, wherein
an outer land portion is provided on an outer side of the outer main groove B of the two outer main grooves in the tire lateral direction,
a circumferential auxiliary groove and outer lug grooves are provided in a region of the outer land portion, the circumferential auxiliary groove formed in the entire circumference in the tire circumferential direction, the outer lug grooves extending in the tire lateral direction from the outer side in the tire lateral direction and being closed without communicating with the outer main groove B, and
the outer lug grooves intersect the circumferential auxiliary groove.

13. The pneumatic tire according to claim 1, wherein
the first sipes are provided to be inclined in the tire lateral direction from the two outer main grooves to the inner continuous land portion and to be closed in the regions of the two intermediate continuous land portions,
as seen from the tread surface, a surface contour shape of each of first sipes a of the first sipes, which extends from an outer main groove A being one of the two outer main grooves, comprises:
an extending portion extending constantly in an extension direction or with smooth change from the outer main groove A; and
a bent portion provided on a side of a closed end portion of each of the first sipes a, the bent portion bending each of the first sipes a from the extending portion and extending to a direction opposite a direction to which the extending portion extends in the tire circumferential direction,
in the bent portion, the sipe main body portion extends from the extending portion constantly in the extension direction or with smooth change without being bent and is closed, and the sipe chamfered portion forms a bent shape of the bent portion, and
the asymmetric shape portion being positioned in the bent portion.

14. A pneumatic tire, comprising:
a tread portion extending in a tire circumferential direction, having an annular shape, and having a tread pattern, wherein
the tread pattern comprising:
two inner main grooves being positioned on both sides in a tire lateral direction with respect to a tire equator line of the pneumatic tire and being formed in an entire circumference in the tire circumferential direction;
two outer main grooves being provided and sandwiching the two inner main grooves on an inner side in the tire lateral direction;
an inner continuous land portion being sandwiched between the two inner main grooves and being continuously formed in the entire circumference in the tire circumferential direction;
two intermediate continuous land portions being sandwiched between one of the two inner main grooves and one of the two outer main grooves and between the other one of the two inner main grooves and the other one of the two outer main grooves, respectively, the two intermediate continuous land portions being continuously formed in the entire circumference in the tire circumferential direction, the two intermediate continuous land portions being outward in the tire lateral direction of the inner continuous land portion; and first sipes being provided in regions of the two intermediate continuous land portions and extending inward in the tire lateral direction from the two outer main grooves, regions of the inner continuous land portion and the two intermediate continuous land portions being not provided with lug grooves extending from the two inner main grooves or the two outer main grooves, edges on both sides of one of the two inner main grooves each comprising a groove chamfered portion having a chamfered width changing in the tire circumferential direction and forming a zigzag shape as seen from a tread surface of the tread portion, and the first sipes each including:
a sipe main body portion having a constant distance between sipe wall surfaces on a sipe bottom side in a depth direction of the first sipes; and
a sipe chamfered portion inclined so that the sipe wall surfaces are open to the tread surface on a side of the tread surface of the first sipes,
a sipe wall surface being one of two facing sipe wall surfaces comprises a first chamfered surface and a second chamfered surface at different positions in a sipe depth direction, an inclination angle of each of the first chamfered surface and the second chamfered surface with respect to the depth direction of the first sipes being different each other,
the sipe chamfered portion forms a bent shape of the bent portion, and
the inclination angle of the second chamfered surface is larger than the inclination angle of the first chamfered surface.

* * * * *